US006769324B2

United States Patent
Kajita

(10) Patent No.: US 6,769,324 B2
(45) Date of Patent: Aug. 3, 2004

(54) BALL SCREW

(75) Inventor: Toshiharu Kajita, Kanagawa (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 09/985,847

(22) Filed: Nov. 6, 2001

(65) Prior Publication Data
US 2002/0078774 A1 Jun. 27, 2002

(30) Foreign Application Priority Data

Nov. 7, 2000 (JP) .................................. P. 2000-339362
Sep. 27, 2001 (JP) .................................. P. 2001-298523

(51) Int. Cl.⁷ .............................................. F16C 29/06
(52) U.S. Cl. ...................................... 74/424.88; 384/45
(58) Field of Search ....................... 74/424.88, 424.82, 74/424.83

(56) References Cited

U.S. PATENT DOCUMENTS 3,162,098 A * 12/1964 Lindberg ................. 74/424.88
3,176,535 A * 4/1965 Rowland ................. 74/424.88
5,492,030 A * 2/1996 Benton et al. ........... 74/424.88
6,513,978 B2 * 2/2003 Shirai et al. ................... 384/45

FOREIGN PATENT DOCUMENTS

| JP | 6-47159 | 11/1994 |
| JP | 7-9259 | 2/1995 |
| JP | 2582068 | 7/1998 |
| JP | 11-51049 | 2/1999 |
| JP | 2881855 | 2/1999 |
| JP | 11-315835 | 11/1999 |

* cited by examiner

Primary Examiner—Matthew C. Graham
(74) Attorney, Agent, or Firm—Sughrue Mion, PLLC

(57) ABSTRACT

A super finishing is carried out after grinding, so that surface roughness of a ball rolling groove of a screw shaft is made 0.12 μm or less in an average roughness (Ra). Separators 7 having ball holding surfaces shaped in concave surface are disposed between balls respectively.

12 Claims, 3 Drawing Sheets

BALL SCREW

BACKGROUND OF THE INVENTION

The present invention relates to a ball screw.

The ball screw is directed to a linear guide apparatus composed of a screw shaft, a nut and balls. Helical grooves are defined in an outer peripheral surface of the screw shaft and in an inner peripheral surface of the nut, and these helical grooves form a raceway of balls. When balls roll in the raceway, the nut linearly moves with respect to the screw shaft. That is, the helical grooves of the screw shaft and the nut form the ball rolling grooves. In addition, the nut is provided at the outside with a circulating path.

Ball screws as mentioned above have been demanded to reduce vibrations and noises. For example, Japanese patent examined publication No. Hei. 7-9259, Japanese utility model examined publication No. Hei. 6-47159 and Japanese Utility Model Registration No. 2,582,068 describe ball screws devised to reduce vibrations and noises caused in the circulating path. Japanese patent unexamined publication No. Hei. 11-51049 describes a ball screw having a retainer of a special structure for smoothly receiving balls between the ball rolling groove and the circulating path.

As a device for reducing vibrations and noises caused in the ball rolling groove, Japanese patent unexamined publication No. Hei. 11-315835 describes a technology. This publication sets forth that separators having ball holding surfaces are arranged between balls and balls to cancel contacting of balls one another.

On the other hand, Japanese Patent No. 2,881,855 describes grinding the ball rolling groove in the ball screw, followed by a super finishing.

However, these prior arts still have rooms for further improving the reduction of vibrations and noises of the ball screw.

SUMMARY OF THE INVENTION

It is an object of the present invention to provide a ball screw more effectively reducing vibrations and noises than conventional ball screws.

The above object can be achieved by a ball screw comprising:
- a screw shaft having a first helical ball rolling groove in an outer periphery thereof;
- a nut having a second helical ball rolling groove in an inner periphery thereof; and
- a plurality of balls arranged in a helical raceway defined by the first and second helical ball rolling grooves,
- wherein at least one of the first and second helical ball rolling grooves has a surface with a surface roughness of 0.12 µm or less in average roughness (Ra) along a helical direction of the helical raceway.

In an embodiment of the present invention, the first helical ball rolling grooves may have the surface with a surface roughness of 0.12 µm or less in average roughness (Ra) along a helical direction of the helical raceway.

In addition, in an embodiment of the present invention, the second helical ball rolling grooves may have the surface with a surface roughness of 0.12 µm or less in average roughness (Ra) along a helical direction of the helical raceway.

Further, in an embodiment of the present invention, both of the first and second helical ball rolling grooves may have the surface with a surface roughness of 0.12 µm or less in average roughness (Ra) along a helical direction of the helical raceway.

Furthermore, in an embodiment of the present invention, the ball screw may further comprises:
- a retainer rotatably supporting the balls between the screw shaft and the nut, wherein the retainer may comprise a plurality of separators interposed between adjacent balls, each of the separators having concave surfaces on both sides thereof.

Moreover, in an embodiment of the present invention, the ball screw may further comprises:
- a retainer rotatably supporting the balls between the screw shaft and the nut,
- wherein the retainer may comprise a plurality of pockets for rotatably holding the balls respectively, each of pockets having concave surfaces between which each of said balls is interposed.

In a preferable embodiment of the present invention, each of the balls may have an outer diameter of 3.969 mm or less.

Further, in the preferable embodiment of the present invention, each of the balls may have an outer diameter in the range from 2.000 mm to 3,969 mm with both inclusive.

As the finishing methods for making the surface roughness of the ball rolling groove 0.12 µm or less in the average roughness (Ra), there are a super finish grinding, a horning finish, a lapping finish, polishing finish or buffing finish.

Moreover, in a preferable embodiment of the present invention, the ball screw may further comprise a retainer rotatably supporting the balls between the screw shaft and the nut,

DETAILED DESCRIPTION OF THE PREFERRED EMBODIMENTS

Reference will be made to embodiments of the invention as follows.

[1st Embodiment]

Figure 1:
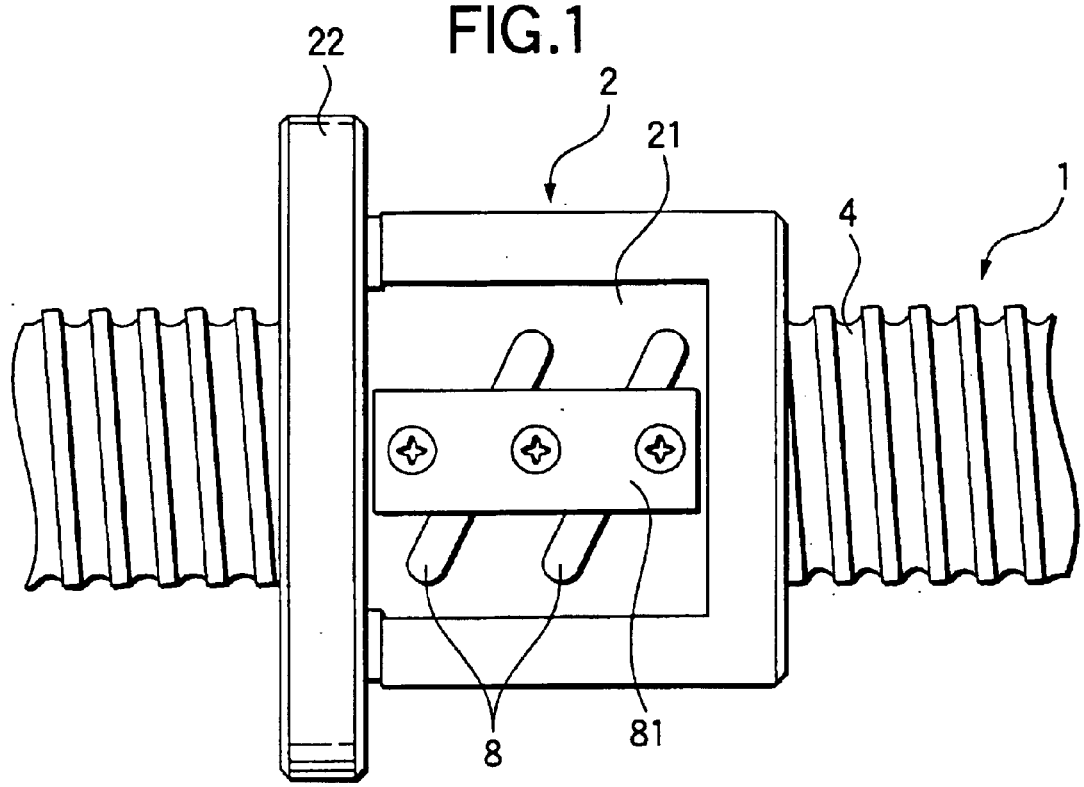
FIG. 1 is a plan view showing the ball screw corresponding to the 1st embodiment according to the 1st embodiment of the invention.
Figure 2:
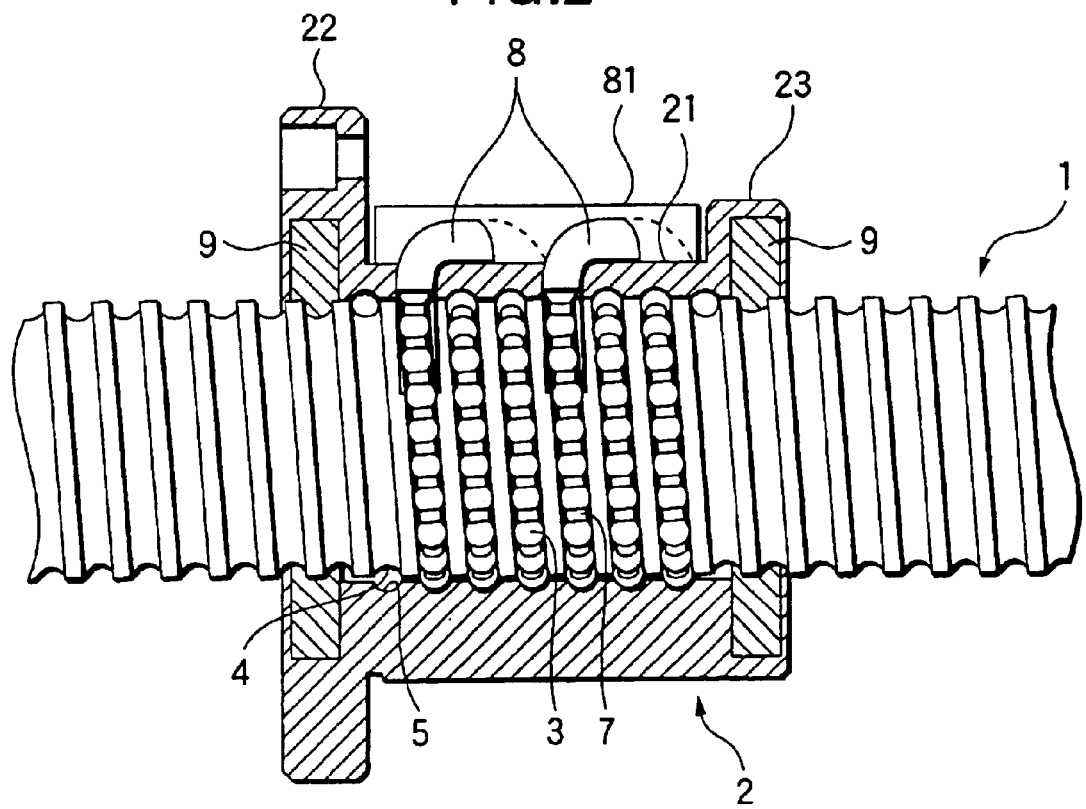
FIG. 2 is a view showing a condition of taking off an only nut of the ball screw of FIG. 1 at a face including the axial line of the nut.
Figure 3:
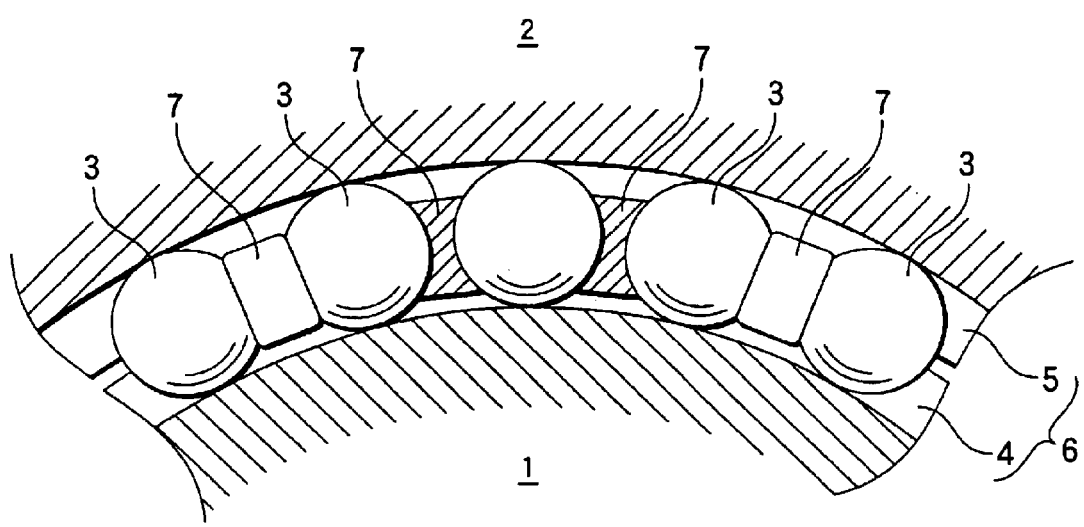
FIG. 3 is a cross sectional view showing a raceway of the ball screw of FIG. 1.

FIG. 1 is a plan view showing the ball screw corresponding to an embodiment according to a 1st aspect of the invention. FIG. 2 is a view showing a condition of taking off an only nut of the ball screw of FIG. 1 at a surface including the axial line of the nut. FIG. 3 is a cross sectional view showing a raceway of the ball screw of FIG. 1. FIG. 4 shows a relationship between a separator and the balls of the ball screw of FIG. 1.

The ball screw includes a screw shaft 1, a nut 2 and balls 3. In the outer periphery of the screw shaft 1, a helical ball rolling groove 4 is formed, while in the inner periphery of the nut 2, a helical ball rolling groove 5 is formed. In this embodiment (Sample No. 1-1), the super finishing is carried out, followed by grinding, so that the surface roughness of the ball rolling grooves 4, 5 of the screw shaft 1 and the nut 2 is made 0.12 µm in the average roughness (Ra) following the helical direction of the ball rolling grooves.

The ball rolling groove 4 of the screw shaft 1 in the nut 2 and the ball rolling groove 5 of the nut 2 form the raceway 6 of the balls 3 in the nut 2. All between the balls 3 and the balls 3, separators 7 are arranged.

Figure 4A:
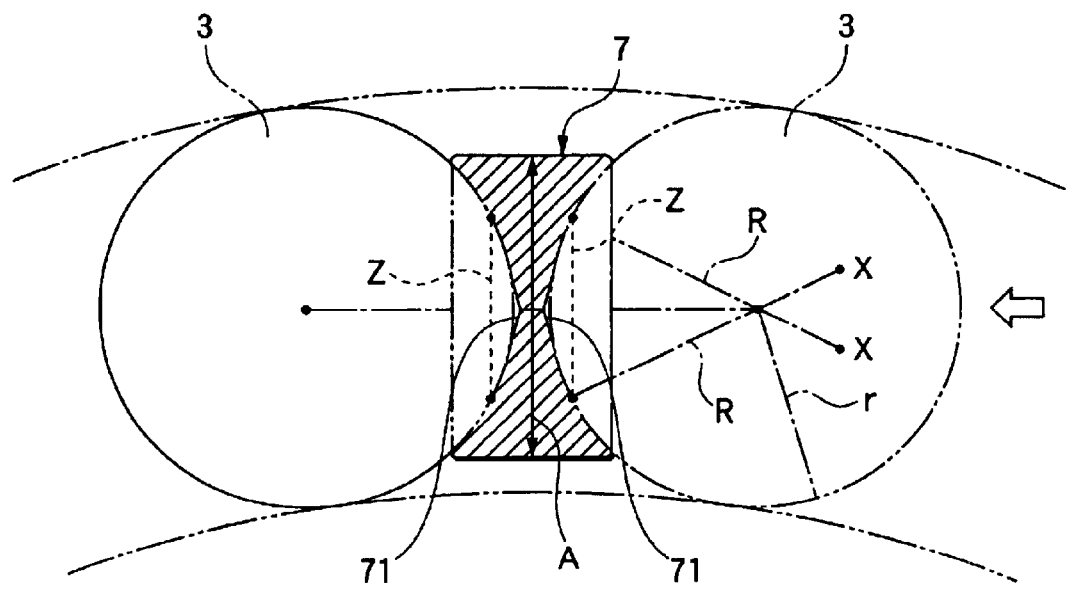
FIGS. 4A and 4B show a relationship between a separator and the balls of the ball screw of FIG. 1.

As seen in FIG. 4A, the shape of the separator 7 is concave 71 (ball holding surfaces) in both bottoms of a pillar. A diameter A of the pillar is somewhat smaller than a diameter of the ball 3. The concave surfaces 71 are two combined spherical surfaces of the same radius of curvature and Gothic arch in cross section.

Figure 4B:
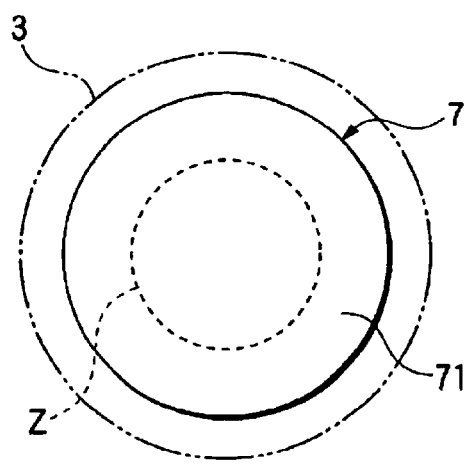

The Gothic arch shape is meant that two arcs of the same radius slide center positions (X) and are connected such that radii cross each other. The concave surface 71 is formed in such a manner that the radius r of the ball 3 is smaller than the radius R of the concave surface 71 and a crossing position (Y) of the radii R each other of the concave surfaces 71 is center positions of the balls 3. Therefore, as seen in FIG. 4B, the concave surface 71 of the separator 7 and the ball 3 make a linear contact via a circle shown with a dotted line Z.

Thereby, since the ball 3 can contact the concave surface 71 of the separator 7 at very low friction, sliding resistance between the ball 3 and the separator 7 can be reduced, and accordingly, friction between the ball 3 and the separator 7 can be considerably lowered. Therefore, circulating property of the separator 7 is good, thereby enabling to greatly decrease worsening in working owing to balls vying each other, friction or injuring of the balls, and as a result, very much reducing torque fluctuation or noises of the balls.

The nut 2 is provided in the outer periphery with a cutout 21 which disposed with a tube like circulating path 8 secured to the cutout 21 with a tube presser 81. The nut 2 is provided at one end in the axial direction with a flange 22 for securing the nut 2 to a table. Between the flange 22 and the screw shaft 1 and between the other end of the nut 2 in the axial direction and the screw shaft 1, dust tight seals 9 close.

As the ball screw 1 in FIG. 1, such a screw was prepared having diameter of the screw shaft 1: 20 mm, lead: 10 mm, diameter (2r) of the ball 3: 3.969 mm and circuit number: 1 raw of 2.5 wind. This ball screw (Sample No. 1-1) was attached to a noise measuring apparatus, the screw shaft 1 was rotated at rotation number: 4000 rpm, and noise generated in the ball screw was investigated at a position of 400 mm apart from an axial center of the screw shaft 1.

As Sample No. 1-2, a ball screw of the same structure as that of Sample No. 1-1 excepting the following points was prepared for performing the same test. Since this ball screw was not carried out with the super finishing after polishing when forming the ball rolling groove 5 of the nut 2, the surface roughness of the ball rolling groove 5 of the nut 2 was 0.18 μm in the average roughness (Ra) following the helical direction of the ball rolling grooves.

As Sample No. 1-3 (Comparative Example), the ball screw of the same structure as that of Sample No. 1-1 excepting the following points was prepared for performing the same test.

In this ball screw, the separators 7 were not disposed between all balls, so that the balls 3 were closely arranged.

As Sample No. 1-4 (Comparative Example), the ball screw of the same structure as that of Sample No. 1-1 excepting the following points was prepared for performing the same test.

Since this ball screw was not carried out with the super finishing after polishing when forming the ball rolling groove 5 of the nut 2, the surface roughness of the ball rolling groove 5 of the nut 2 was 0.18 μm in the average roughness (Ra). Further, the separators 7 were not disposed between all balls, so that the balls 3 were closely arranged.

As Sample No. 1-5 (Comparative Example), the ball screw of the same structure as that of Sample No. 1-1 excepting the following points was prepared for performing the same test. Since this ball screw was not carried out with the super finishing after polishing when forming the screw shaft 1 and the ball rolling grooves 4, 5 of the nut 2, the surface roughness of the ball rolling groove 4 of the screw shaft 1 was 0.19 μm in the average roughness (Ra) following the helical direction of the ball rolling groove. Further, the surface roughness of the ball rolling groove 5 of the nut 2 was 0.18 μm in the average roughness (Ra) following the helical direction of the ball rolling groove.

As Sample No. 1-6 (Comparative Example), the ball screw of the same structure as that of Sample No. 1-5 excepting the following points was prepared for performing the same test.

In this ball screw, the separators 7 were not disposed between all balls, so that the balls 3 were closely arranged.

Noise measured values of respective Samples and noise reduced values on the basis of the noise measured values of Samples 1-6 being the standard value (0) in Table 1.

TABLE 1

| No. | Ra (μm) of Groove | | | Noise measured value (dB) | Noise reduced value (dB) |
| --- | --- | --- | --- | --- | --- |
|  | Screw shaft | Nut | Separator |  |  |
| 1-1 | 0.12 | 0.12 | Present | 67.0 | −9.0 |
| 1-2 | 0.12 | 0.18 | Present | 68.0 | −8.0 |
| 1-3 | 0.12 | 0.12 | Absent | 72.0 | −4.0 |
| 1-4 | 0.12 | 0.18 | Absent | 73.0 | −3.0 |
| 1-5 | 0.19 | 0.18 | Present | 74.5 | −1.5 |
| 1-6 | 0.19 | 0.18 | Absent | 76.0 | Standard |

As is seen from the results, in Samples Nos. 1-1 and 1-2, the separators 7 are disposed between all the balls 3, and the surface roughness of the screw shaft 1 and the ball rolling grooves 4, 5 (in No. 1-2, only the ball rolling groove 4 of the screw shaft 1) were made 0.12 μm or less in the average roughness (Ra) following the helical direction of the ball rolling groove, and by carrying out these two operations, the larger noise reducing values (that is, unexpected excellent noise reducing effect) was obtained than the case of merely adding the noise reduced value when carrying out any one of the two operations.

In a case of a mere addition, the noise reduced value of No. 1-1 was supposed as "−5.5 dB" being the addition of the noise reduced values of Nos. 1-3 and 1-5, but was "−9.0 dB" corresponding to 1.64 times of said supposed value. In the case of the mere addition, the noise reduced value of No. 1-2 was supposed as "−4.5 dB" being the addition value of the noise reduced values of Nos. 1-4 and 1-5, but was "−8.0 dB" corresponding to 1.78 times of said supposed value.

The noise reduced value obtained by making the surface roughness of the ball rolling groove 4 of the screw shaft 1 0.12 μm or less in the average roughness (Ra) following the helical direction of the ball rolling groove, was "−6.5 dB" (difference between Nos. 1-2 and 1-5), while the reduced value obtained by making the surface roughness of the ball rolling groove 5 of the nut 2 in addition to the surface roughness of the ball rolling groove 4 of the screw shaft 1 0.12 μm or less in the average roughness (Ra), is "−1.0 dB" (difference between Nos. 1-1 and 1-2), and from this face, it is seen that excellent noise reducing effect is obtained by making the surface roughness of the ball rolling groove 4 of the screw shaft 1 0.12 μm or less in the average roughness (Ra).

In this embodiment, the separators 7 are arranged between all the balls 3, and the ball screw of the invention is not limited to the arrangement of the separators between all the balls. Incidentally, between the balls 3 and the balls 3, the respectively independent separators 7 are interposed, and holders connecting the respective separators may be interposed The ball screw of the invention is suitably applied when a ball diameter is 32 mm or less.

[2nd Embodiment]

The present embodiment depends on the 3rd and 4th aspects of the invention, and as the ball screws of Samples Nos. 1-3 and 1-4 of the 1st embodiment are within these aspects, they are examples of this invention. The structure of No. 1-3 and test results are rendered to be No. 2-1, and the structure of No. 1-4 and test results are rendered to be No. 2-2, and they are shown in Table 2. Further, the structure of No. 1-6 and test results of the 1st embodiment are rendered to be No. 2-6, and they are shown in Table 2.

In addition thereto, as Sample No. 2-3 (Comparative Example), the ball screw of the same structure as that of Sample No. 1-6 of the 1st Embodiment excepting the following points was prepared for performing the same test. Since this ball screw was not carried out with the super finishing after polishing when forming the ball rolling groove 4 of the screw shaft 1 but the ground finish was at a maximum level, the surface roughness of the screw shaft 1 was 0.15 μm in the average roughness (Ra) following the helical direction of the ball rolling groove.

As Sample No. 2-4 (Example), the ball screw of the same structure as that of Sample No. 1-6 of the 1st Embodiment excepting the following points was prepared for performing the same test. Since this ball screw was carried out with the super finishing as Sample 1-1 after polishing when forming the ball rolling groove 5 of the nut 2, the surface roughness of the ball rolling groove 5 of the nut 2 was 0.12 μm in the average roughness (Ra) following the helical direction of the ball rolling groove.

As Sample No. 2-5 (Comparative Example), the ball screw of the same structure as that of Sample No. 2-4 excepting the following points was prepared for performing the same test. Since this ball screw was not carried out with the super finishing after polishing when forming the ball rolling groove 4 of the nut 2, but the ground finish was at a maximum level.

Noise measured values of respective Samples and noise reduced values on the basis of the noise measured values of Samples 2-6 being the standard value (0) are shown in Table 2.

TABLE 2

| No. | Ra (μm) of Groove | | Separator | Noise measured value (dB) | Noise reduced value (dB) |
| | Screw shaft | Nut | | | |
| --- | --- | --- | --- | --- | --- |
| 2-1 | 0.12 | 0.12 | Absent | 72.0 | −4.0 |
| 2-2 | 0.12 | 0.18 | Absent | 73.0 | −3.0 |
| 2-3 | 0.15 | 0.18 | Absent | 75.0 | −1.0 |
| 2-4 | 0.19 | 0.12 | Absent | 73.5 | −2.5 |
| 2-5 | 0.19 | 0.15 | Absent | 75.5 | −0.5 |
| 2-6 | 0.19 | 0.18 | Absent | 76.0 | Standard |

As is seen from the results, in No. 2-3 where the surface ruggedness of the ball rolling groove 4 of the screw shaft 1 was 0.15 μm in the average roughness (Ra) following the helical direction of the ball rolling groove, the noise reduced value was 1.0 dB, while in No. 2-2 of 0.15 μm, the noise reduced value was 3.0 dB with a large noise reducing effect.

Further in No. 2-5 where the surface roughness of the ball rolling groove 5 of the nut ball 2 was 0.15 μm in the average roughness (Ra) following the helical direction of the ball rolling groove, the noise reduced value was 0.5 dB, while in No. 2-4 of 0.12 μm, the noise reduced value was 2.5 dB with a large noise reducing effect.

In No. 2-1 where the surface roughness of the ball rolling groove 4 of the screw shaft 1 and the surface roughness of the ball rolling groove 5 of the nut 2 were both 0.12 μm in the average roughness (Ra), the noise reduced value was 4.0 dB with an especially large noise reducing effect.

That is, it was found that if making at least either of the surface roughness of the ball rolling groove 4 of the screw shaft 1 and the surface roughness of the ball rolling groove 5 of the nut 2 in the average roughness (Ra), the large noise reducing effect was obtained.

It has been confirmed that this noise reducing effect tends to become small when the ball diameter is 3.969 mm or larger, and if the ball diameter is in the range from 2.000 mm to 3.969 mm with both inclusive, sufficient effects are brought about.

As explained above, according to the invention, such ball screws very low in vibration and noises are offered.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A ball screw comprising:
   a screw shaft having a first helical ball rolling groove in an outer periphery thereof;
   a nut having a second helical ball rolling groove in an inner periphery thereof;
   a plurality of balls arranged in a helical raceway defined by the first and second helical ball rolling grooves,
   wherein at least one of the first and second helical ball rolling grooves has a surface with a surface roughness of 0.12 μm or less in average roughness (Ra) along a helical direction of the helical raceway; and
   a retainer rotatably supporting the balls between the screw shaft and the nut,
   wherein the retainer comprises a plurality of separators interposed between adjacent balls, each of the separators having concave surfaces on both sides thereof.

2. The ball screw according to claim 1, wherein each of the balls has an outer diameter of 3.969 mm or less.

3. The ball screw according to claim 2, wherein each of the balls has an outer diameter of 2.000 mm or more.

4. The ball screw according to claim 1, wherein the screw shaft has an outer diameter of 32 mm or less.

5. A ball screw comprising:
   a screw shaft having a first helical ball rolling groove in an outer periphery thereof;
   a nut having a second helical ball rolling groove in an inner periphery thereof;
   a plurality of balls arranged in a helical raceway defined by the first and second helical ball rolling grooves,
   wherein at least one of the first and second helical ball rolling grooves has a surface with a surface roughness of 0.12 μm or less in average roughness (Ra) along a helical direction of the helical raceway; and
   a retainer rotatably supporting the balls between the screw shaft and the nut, wherein the retainer comprises a plurality of pockets for rotatably holding the balls respectively, each of pockets having concave surfaces between which each of said balls is interposed.

6. The ball screw according to claim 5, wherein each of the bails has an outer diameter of 3.969 mm or less.

7. The ball screw according to claim 6, wherein each of the balls has an outer diameter of 2.000 mm or more.

8. The ball screw according to claim 5, wherein the screw shaft has an outer diameter of 32 mm or less.

9. A ball screw comprising:

a screw shaft having a first helical ball rolling groove in an outer periphery thereof;

a nut having a second helical ball rolling groove in an inner periphery thereof;

a plurality of balls arranged in a helical raceway defined by the first and second helical ball rolling grooves, wherein at least one of the first and second helical ball rolling grooves has a surface with a surface roughness of 0.12 $\mu$m or less in average roughness (Ra) along a helical direction of the helical raceway; and a retainer rotatably supporting the balls between the screw shaft and the nut.

10. The ball screw according to claim 9, wherein each of the balls has an outer diameter of 3.969 mm or less.

11. The ball screw according to claim 10, wherein each of the balls has an outer diameter of 2.000 mm or more.

12. The ball screw according to claim 9, wherein the screw shaft has an outer diameter of 32 mm or less.

* * * * *